United States Patent
Kim

(10) Patent No.: US 10,754,570 B2
(45) Date of Patent: Aug. 25, 2020

(54) MEMORY SYSTEM, OPERATING METHOD THEREOF AND COMPUTING SYSTEM FOR CLASSIFYING DATA ACCORDING TO READ AND WRITE COUNTS AND STORING THE CLASSIFIED DATA IN A PLURALITY OF TYPES OF MEMORY DEVICES

(71) Applicant: SK hynix Inc., Gyeonggi-do (KR)

(72) Inventor: Yi-Seok Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/238,726

(22) Filed: Jan. 3, 2019

(65) Prior Publication Data

US 2019/0303032 A1 Oct. 3, 2019

(30) Foreign Application Priority Data

Mar. 28, 2018 (KR) .................. 10-2018-0036122

(51) Int. Cl.
*G06F 13/00* (2006.01)
*G06F 3/06* (2006.01)

(52) U.S. Cl.
CPC .......... *G06F 3/0646* (2013.01); *G06F 3/0604* (2013.01); *G06F 3/0673* (2013.01)

(58) Field of Classification Search
CPC .... G06F 3/0646; G06F 3/0604; G06F 3/0673; G06F 3/0683; G06F 3/0635; G06F 3/0659

See application file for complete search history.

(56) References Cited

U.S. PATENT DOCUMENTS

| | | | |
|---|---|---|---|
| 9,396,026 B2 | 7/2016 | Ichikawa et al. | |
| 2009/0144393 A1* | 6/2009 | Kudo | G06F 9/5044 709/218 |
| 2012/0047287 A1* | 2/2012 | Chiu | G06F 3/0605 710/8 |
| 2017/0075812 A1* | 3/2017 | Wu | G06F 12/0246 |
| 2018/0267736 A1* | 9/2018 | Yen | G06F 3/0679 |

FOREIGN PATENT DOCUMENTS

| | | |
|---|---|---|
| KR | 1020140078390 | 6/2014 |
| KR | 101464338 | 11/2014 |
| KR | 1020160022226 | 2/2016 |
| KR | 10-2019-0052367 | 5/2019 |

* cited by examiner

*Primary Examiner* — Jing-Yih Shyu
(74) *Attorney, Agent, or Firm* — IP & T Group LLP

(57) ABSTRACT

A memory system includes: a plurality of types of memory devices; and a controller including: a counter configured to determine R/W ratio; a data manager configured to generate meta data corresponding to the target data; and a selector configured to compare the R/W ratio with a threshold of each of the plurality of memory devices, respectively, and select a memory device for storing the target data and select a memory device for storing the meta data; a processor configured to store the target data and meta data in the each selected memory device.

17 Claims, 9 Drawing Sheets

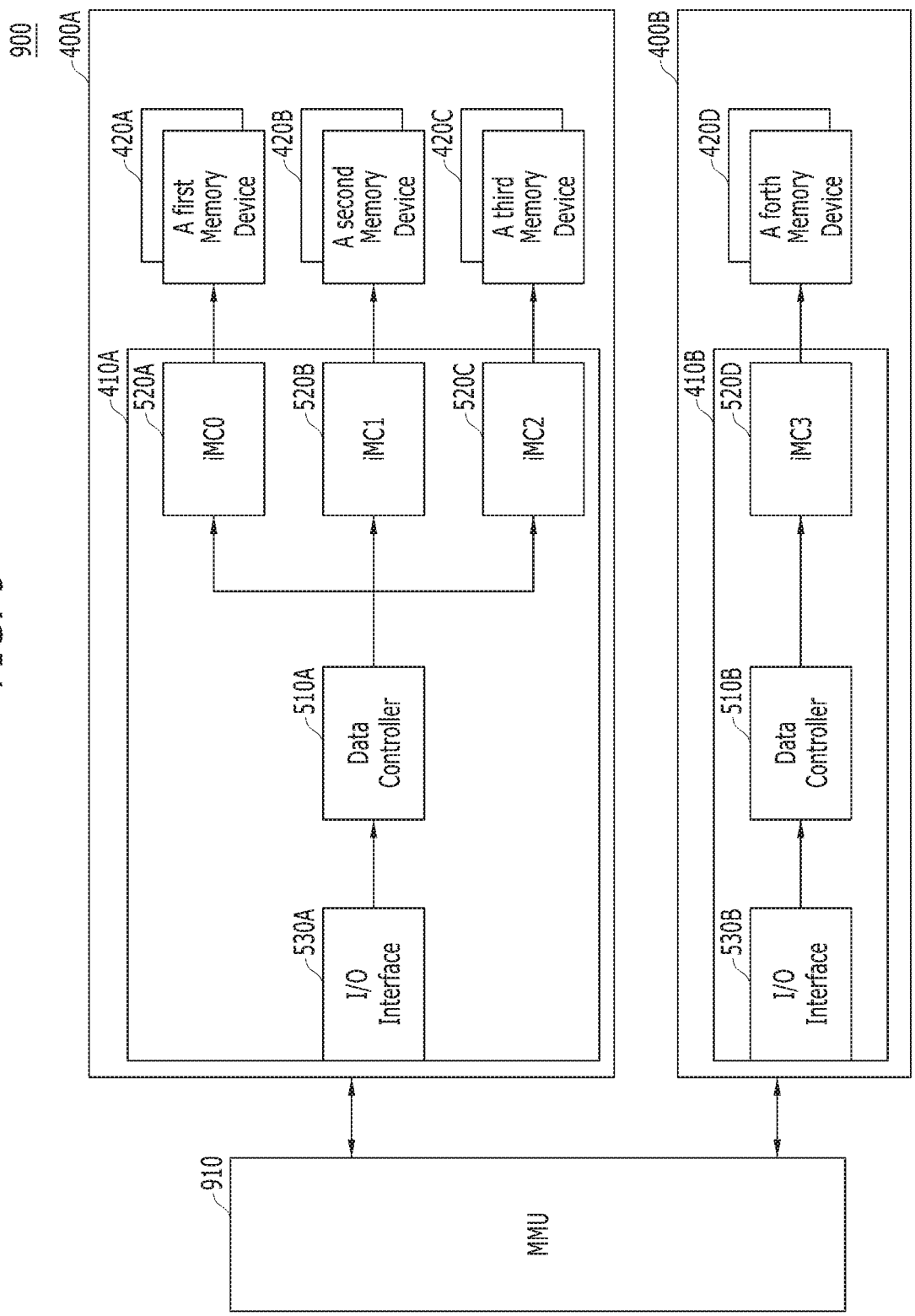

MEMORY SYSTEM, OPERATING METHOD THEREOF AND COMPUTING SYSTEM FOR CLASSIFYING DATA ACCORDING TO READ AND WRITE COUNTS AND STORING THE CLASSIFIED DATA IN A PLURALITY OF TYPES OF MEMORY DEVICES

CROSS-REFERENCE TO RELATED APPLICATION

The present application claims priority to Korean Patent Application No. 10-2018-0036122, filed on Mar. 28, 2018, which is incorporated by reference herein in its entirety.

BACKGROUND

1. Field

Various embodiments of the present disclosure relate to a memory system capable of processing data efficiently, an operating method thereof and computing system including the memory system.

2. Description of the Related Art

Data are becoming important assets in the fourth industrial revolution, and the demands for new technology in support of transferring and analyzing large-scale data at a high data rate are increasing. For example, as artificial intelligence, autonomous driving, robotics, health care, virtual reality (VR), augmented reality (AR), and smart home technologies spread, demands for servers or data centers are increasing.

A legacy data center includes resources for computing, networking, and storing data, in the same equipment. However, a future large-scale data center may have individually constructed resources that are logically restructured. For example, in the large-scale data center, the resources may be modularized at the level of racks, and the modularized resources may be restructured and supplied according to the usage. Therefore, a converged storage or memory device, which can be used for the future large-scale data center, is needed.

SUMMARY

Embodiments of the present disclosure are directed to a memory system capable of storing data efficiently into a memory device, and an operating method thereof.

In accordance with an embodiment of the present invention, a memory system may include: a plurality of types of memory devices; and a controller including: a counter configured to determine R/W ratio—a ratio of a number of read operations to a number of write operations of a target data —; a data manager configured to generate meta data corresponding to the target data; and a selector configured to compare the R/W ratio with a threshold of each of the plurality of memory devices, respectively, and select a memory device for storing the target data among the plurality of types of memory devices based on a result of the compare operation and select a memory device for storing the meta data corresponding to the target data among the plurality of types of memory devices based on the memory device in which the target data is stored; a processor configured to store the target data and meta data in the each selected memory device.

In accordance with an embodiment of the present invention, a method for operating a memory system including a plurality of different types of memory devices and a controller that controls each of the plurality of memory devices, may include: determining R/W ratio—a ratio of a number of read operations to a number of write operations of a target data —; comparing the R/W ratio with a threshold of each of the plurality of memory devices; selecting a memory device for storing the target data among the plurality of types of memory devices based on a result of the comparing step; selecting a memory device for storing meta data corresponding to the target data among the plurality of types of memory devices based on the memory device in which the target data is stored; and storing the target data and meta data in the each selected memory device.

In accordance with an embodiment of the present invention, a computing system may include: a first memory system including a plurality of types of memory devices and a first controller configured to control each of the plurality of memory devices; a second memory system including an additional memory device of a type different than any of the types of the plurality of memory devices and a second controller configured to control the additional memory device; and a memory board management unit configured to perform data communication with the first memory system and the second memory system, wherein the first controller and the second controller: determine a R/W ratio with respect to target data received from the memory board management unit, the R/W ratio representing a number of times a read operation is performed on the target data to a number of times a write operation is performed on the target data, compare the R/W ratio with a threshold of each of the plurality of memory devices in the first memory system and the additional memory device in the second memory system, select a target memory device, among the plurality of types of memory devices and the additional memory device, in which to store the target data, and store the target data in the target memory device.

In accordance with an embodiment of the present invention, a pooled memory system may include: a first group of memory devices, which has a first level indicative of at least one of capacity and latency of each of the memory devices in the first group; a second group of memory devices, which has a second level indicative of the at least one of capacity and latency of each of the memory devices in the second group; and a controller configured to: select one of the first and second groups of memory devices based on a characteristic of the target data and based on the first and second levels of the first and second groups of memory devices respectively, and store the target data in at least one memory device of the selected first or second group; wherein the characteristic of the target data includes a ratio of the number of read operations to the number of write operations on the target data.

BRIEF DESCRIPTION OF THE DRAWINGS

FIG. 9 is a diagram schematically illustrating a structure of a computing system in accordance with an embodiment of the present disclosure.

DETAILED DESCRIPTION

Figure 1:
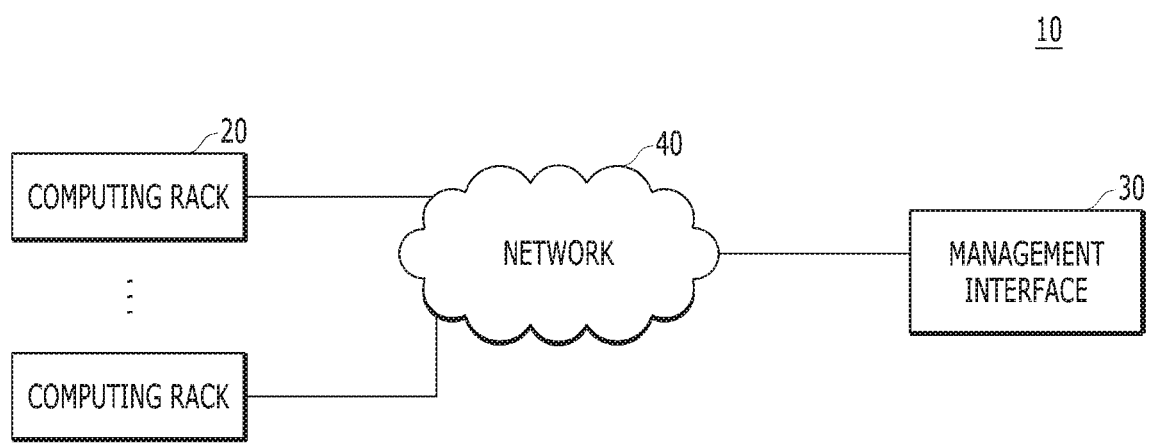
FIG. 1 is a block diagram illustrating a data processing system in accordance with an embodiment of the present disclosure.

Various embodiments of the present disclosure will be described below in more detail with reference to the accompanying drawings. Elements and features of present disclosure may, however, be configured or arranged differently than shown and described in the disclosed embodiments. Thus, the present invention is not limited to the embodiments set forth herein. Rather, these embodiments are provided so that this disclosure is thorough and complete and fully conveys the scope of the present disclosure to those skilled in the art. Throughout the disclosure, like reference numerals refer to like parts throughout the various figures and embodiments of the present disclosure. Also, throughout the specification, reference to "an embodiment," "another embodiment," or the like is not necessarily to only one embodiment, and different references to any such phrase are not necessarily to the same embodiment(s).

FIG. 1 is a block diagram illustrating a data processing system 10. Referring to FIG. 1, the data processing system 10 may include a plurality of computing racks 20, a management interface 30, and a network 40 for communication between the computing racks 20 and the management interface 30. The data processing system 10 having this rack scale architecture may be used by a data center for processing large-scale data.

Each of the computing racks 20 may individually implement one computing device. Alternatively, each of the computing racks 20 may be combined with one or more other computing racks to implement one computing device. The specific structures and operations of the computing racks 20 are described below.

The management interface 30 may provide an interactive interface for a user to control, administrate, or manage the data processing system 10. The management interface 30 may be implemented as any type of a computing device that includes any of a computer, a multi-processor system, a server, a rack-mount server, a board server, a lap-top computer, a notebook computer, a tablet computer, a wearable computing device, a network device, a web device, a distributed computing system, a processor-based system, a consumer electronic device, and on the like.

In some embodiments of the present disclosure, the management interface 30 may be implemented as a distributed system having operation functions which may be performed by the computing racks 20 or having user interface functions which may be performed by the management interface 30. In other embodiments of the present disclosure, the management interface 30 may be implemented as a virtual cloud server that includes multi-computing devices distributed through the network 40. The management interface 30 may include a processor, an input/output subsystem, a memory, a data storage device, and a communication circuit.

The network 40 may provide and/or receive data between the computing racks 20 and the management interface 30 and/or among the computing racks 20. The network 40 may be implemented with an appropriate number of various wired and/or wireless networks. For example, the network 40 may include a publicly accessible global network, such as a wired or wireless local area network (LAN), a wide area network (WAN), a cellular network, and/or the Internet. In addition, the network 40 may include an appropriate number of auxiliary network devices, such as auxiliary computers, routers, and switches.

Figure 2:
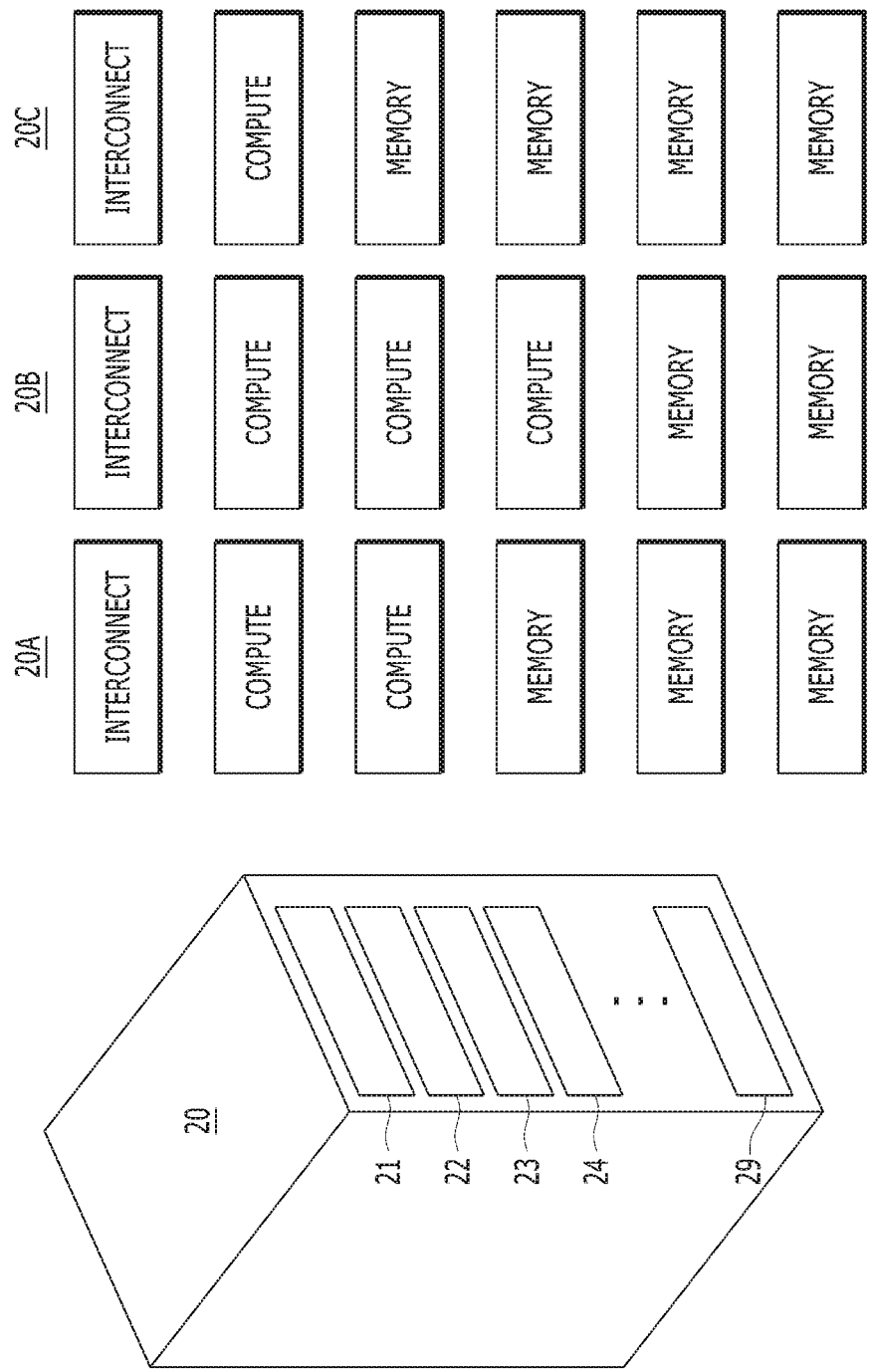
FIGS. 2 and 3 illustrate a computing rack in accordance with an embodiment of the present disclosure.

FIG. 2 illustrates an architecture of a computing rack in accordance with an embodiment of the present disclosure.

Referring to FIG. 2, the computing rack 20 may include constituent elements in various forms and structures. For example, the computing rack 20 may include a plurality of drawers 21 to 29. Each of the drawers 21 to 29 may include a plurality of modules, each of which may include a plurality of boards.

In various embodiments of the present disclosure, the computing rack 20 may be implemented by a combination of appropriate numbers of computer boards, memory boards, and/or interconnect boards. The computing rack 20 is described as a combination of boards, but the computing rack 20 may also be implemented by other elements such as drawers, modules, trays, boards, sashes, or other suitable units. The computing rack 20 may have a structure in which its constituent elements disaggregated and classified according to their functions. The computing rack 20 may have a structure of an interconnect board, a compute board, and a memory board with a classification order from the top down, although the computing rack 20 is not limited to such structure. The computing rack 20 and a computing device including the computing rack 20 may be referred to as 'a rack-scale system' or 'a disaggregated system.'

In an embodiment of the present disclosure, a computing device may be implemented as one computing rack 20. In other embodiments, the computing device may be implemented by all or some constituent elements of two or more computing racks 20, or some constituent elements of one computing rack 20.

In various embodiments of the present disclosure, a computing device may be implemented by a combination of appropriate numbers of compute boards, memory boards, and interconnect boards that are included in the computing rack 20. As illustrated in FIG. 2, a computing rack 20A may include two compute boards, three memory boards, and one interconnect board. In another example, a computing rack 20B may include three compute boards, two memory boards, and one interconnect board. In still another example, a computing rack 20C may include one compute board, four memory boards, and one interconnect board.

Although FIG. 2 illustrates examples in which the computing rack 20 includes appropriate numbers of compute boards, memory boards, and interconnect boards, the computing rack 20 may include additional constituent elements that may be included in typical servers, such as a power system, a cooling system, an input/output device, and so on.

Figure 3:
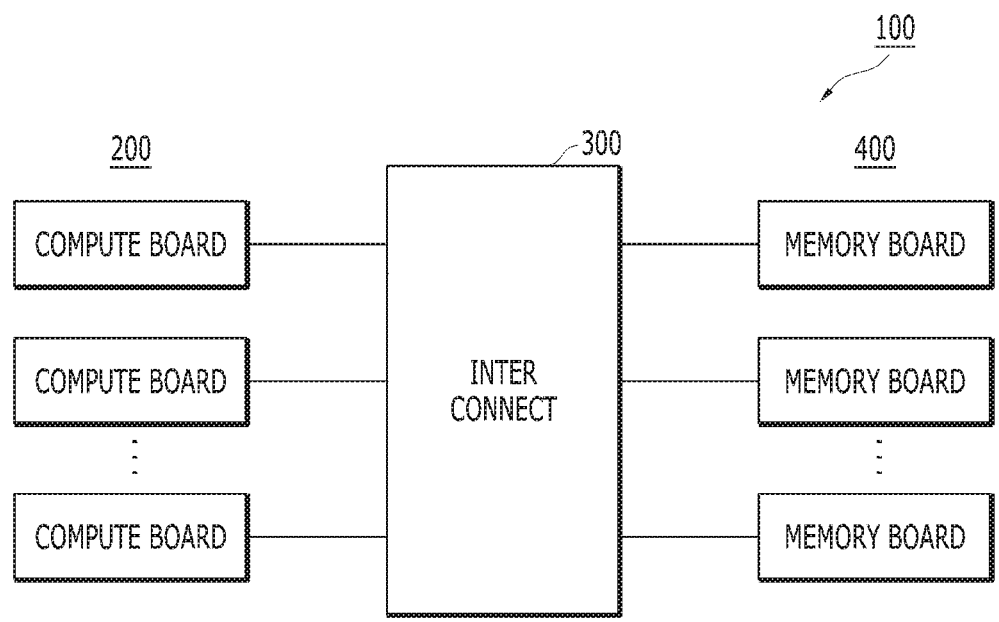

FIG. 3 illustrates a computing device 100 in accordance with an embodiment of the present disclosure.

Referring to FIG. 3, the computing device 100 may include a plurality of compute boards 200, a plurality of memory boards 400, and an interconnect board 300. The compute boards 200 may be pooled compute boards or pooled compute systems. Similarly, the memory boards may be pooled memory boards or pooled memory systems. The computing device 100 is described as a combination of a plurality of boards, but the computing device 100 may also be implemented by elements such as drawers, modules, trays, boards, sashes, or other suitable units.

Each of the compute boards 200 may include one or more of processing elements such as a processor, a processing/control circuit, a central processing unit (CPU), and the like.

Each of the memory boards 400 may include one or more memories, such as volatile memories, non-volatile memories, or a combination thereof. For example, each of the memory boards 400 may include dynamic random access memories (DRAMs), flash memories, memory cards, hard disk drives (HDDs), solid state drives (SSDs), or a combination thereof.

Each of the memory boards 400 may be divided, allocated, or designated by and used by one or more processing elements that are included in each of the compute boards 200. Also, each of the memory boards 400 may store one or more operating systems (OS) that may be initialized and/or executed by the compute boards 200.

The interconnect board 300 may include a communication circuit, a communication device, or a combination thereof, which may be divided, allocated, or designated by and used by one or more processing elements included in each of the compute boards 200. For example, the interconnect board 300 may be implemented by any suitable number of network interface ports, interface cards, or interface switches. The interconnect board 300 may use protocols related to one or more wired communication technologies for communication. For example, the interconnect board 300 may support communication between the compute boards 200 and the memory boards 400 based on one or more of protocols such as peripheral component interconnect express (PCIe), QuickPath interconnect (QPI), Ethernet, and the like.

Figure 4:
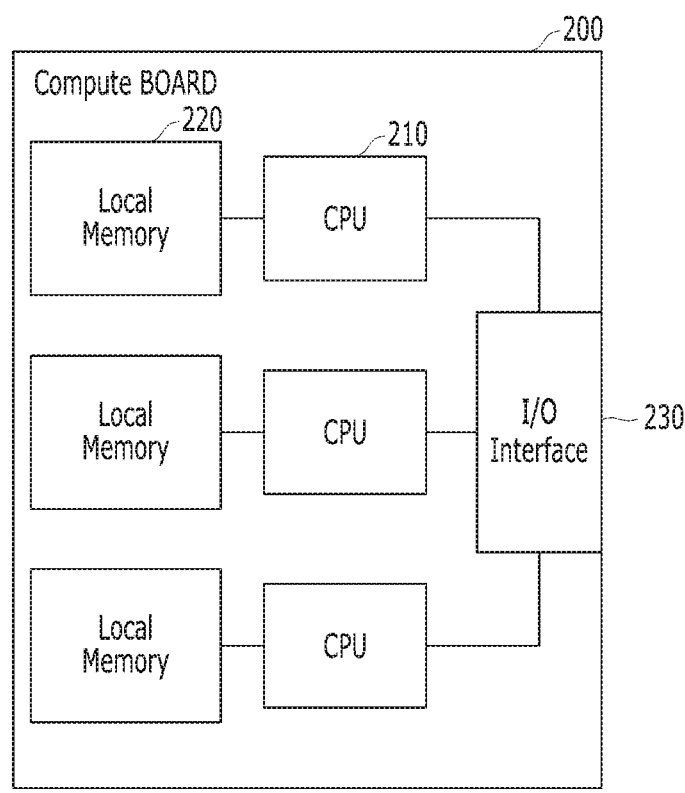
FIG. 4 is a block diagram illustrating a compute board in accordance with an embodiment of the present disclosure.

FIG. 4 is a block diagram illustrating a compute board 200 in accordance with an embodiment of the present disclosure.

Referring to FIG. 4, the compute board 200 may include one or more central processing units (CPUs) 210, one or more local memories 220, and an input/output (I/O) interface 230.

The CPUs 210 may divide, allocate, or designate one or more memory boards to be used, among the memory boards 400 illustrated in FIG. 3. Also, the CPUs 210 may initialize the one or more memory boards, and perform a data read operation and/or a data write (i.e., program) operation on the one or more memory boards.

The local memories 220 may store data to perform an operation of the CPUs 210. In various embodiments of the present disclosure, the local memories 220 may have a one-to-one correspondence with the CPUs 210.

The input/output interface 230 may support interfacing between the CPUs 210 and the memory boards 400 through the interconnect board 300 of FIG. 3. The input/output interface 230 may use protocols related to one or more wired communication technologies, output and provide data from the CPUs 210 to the interconnect board 300, and receive data inputted from the interconnect board 300 to the CPUs 210. For example, the input/output interface 230 may support communication between the CPUs 210 and the interconnect board 300 using one or more of protocols such as peripheral component interconnect express (PCIe), QuickPath interconnect (QPI), Ethernet and the like.

Figure 5:
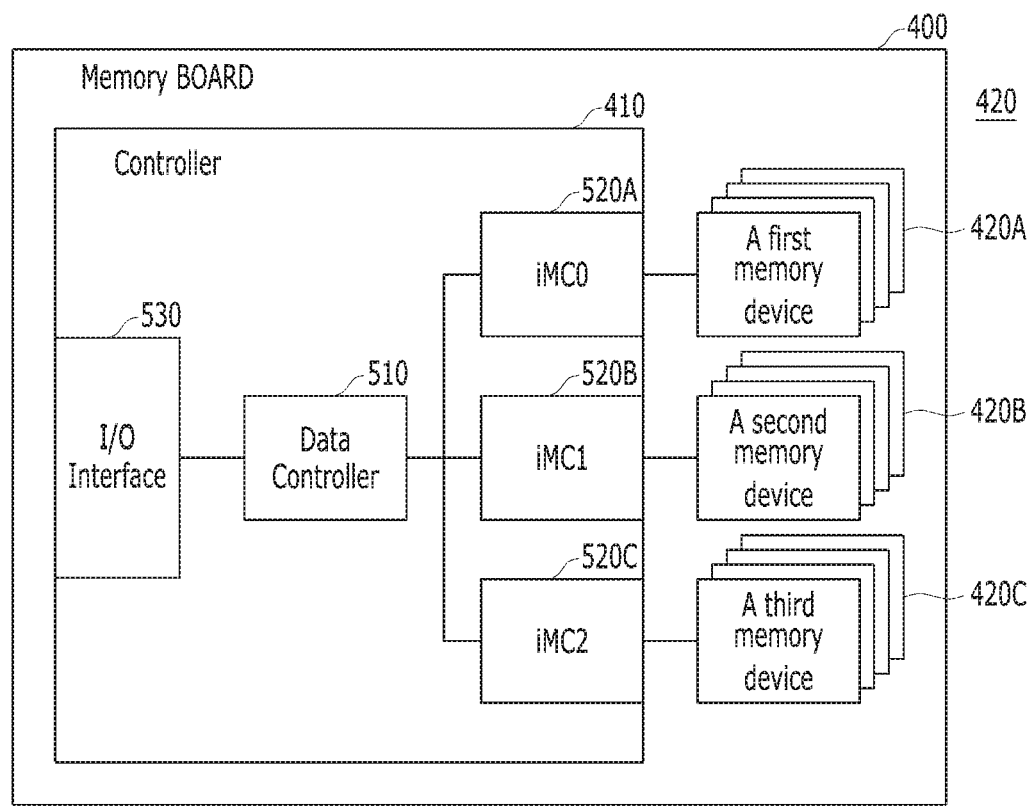
FIG. 5 is a block diagram illustrating a memory board in accordance with an embodiment of the present disclosure.

FIG. 5 is a block diagram illustrating a memory board 400 in accordance with an embodiment of the present disclosure.

Referring to FIG. 5, the memory board 400 may include a controller 410 and a plurality of memories 420. The memories 420 may store (or write) data therein and output (or read) stored data under the control of the controller 410. The memories 420 may include a first memory group 420A, a second memory group 420B, and a third memory group 420C. Each of the first, second, and third memory groups 420A, 420B, and 420C may include multiple memories or memory devices. The first memory group 420A, the second memory group 420B, and the third memory group 420C may have the same characteristics or different characteristics. According to various embodiments of the present disclosure, the first memory group 420A, the second memory group 420B, and the third memory group 420C may include memories having the same characteristics or memories having different characteristics, in terms of capacity or latency.

The controller 410 may include a data controller 510, memory controllers (MC) 520A to 520C, and an input/output (I/O) interface 530.

The data controller 510 may control data provided and received between the memories 420 and the compute boards 200 of FIG. 3. For example, in response to a write request or command, the data controller 510 may receive write data from the compute boards 200 and control a write operation for writing the write data in a corresponding memory among the memories 420. In a read operation, in response to a read request or command, the data controller 510 may read out data stored in a particular memory among the memories 420 and control the read operation for outputting the read data to a corresponding compute board among the compute boards 200.

The memory controllers 520A to 520C may be disposed between the data controller 510 and the memories 420, and may support interfacing between the data controller 510 and the memories 420. The memory controllers 520A to 520C may include a first memory controller (iMC0) 520A, a second memory controller (iMC1) 520B, and a third memory controller (iMC2) 520C that respectively correspond to the first memory group 420A, the second memory group 420B, and the third memory group 420C included in the memories 420. The first memory controller (iMC0) 520A may be disposed between the data controller 510 and the first memory group 420A, and may support data provide and/or data reception between the data controller 510 and the first memory group 420A. The second memory controller (iMC1) 520B may be disposed between the data controller 510 and the second memory group 420B, and may support data provide and/or data reception between the data controller 510 and the second memory group 420B. The third memory controller (iMC2) 520C may be disposed between the data controller 510 and the third memory group 420C, and may support data provide and/or data reception between the data controller 510 and the third memory group 420C. Although an example where the controller 410 includes three memory controllers is described herein, when the first memory group 420A, the second memory group 420B, and the third memory group 420C include DRAMs, the controller 410 may include a single memory controller.

The input/output interface 530 may support interfacing between the data controller 510 and the compute boards 200 through the interconnect board 300 of FIG. 3. The input/output interface 530 may operate according to one or more protocols related to wired communication technologies to provide read data from the data controller 510 to the interconnect board 300, and to provide write data from the interconnect board 300 to the data controller 510. For example, the input/output interface 530 may support communication between the data controller 510 and the interconnect board 300 based on one or more of protocols such as peripheral component interconnect express (PCIe), QuickPath interconnect (QPI), Ethernet, and the like.

Figure 6A:
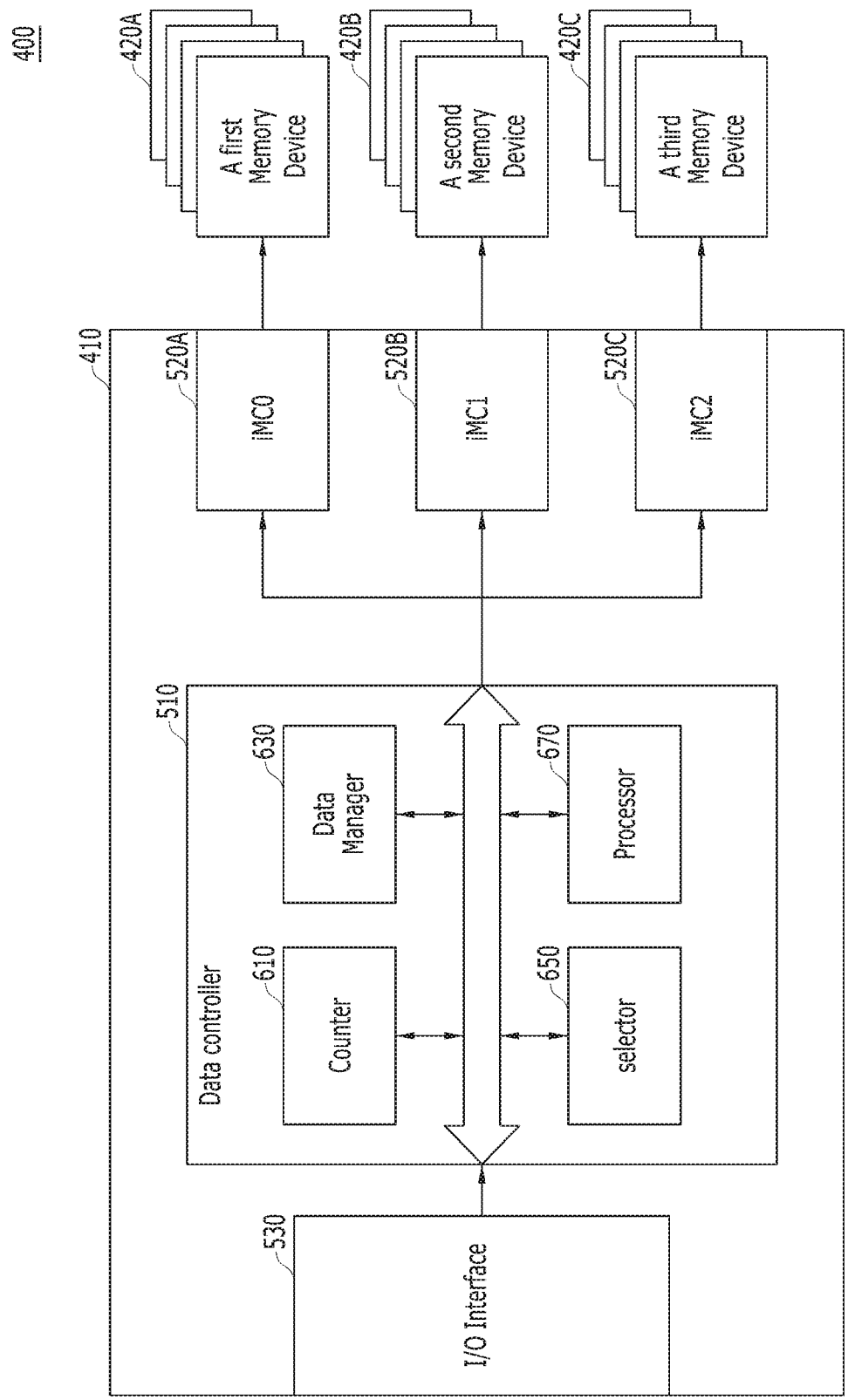
FIG. 6A is a diagram illustrating a configuration of a memory board in accordance with an embodiment of the present disclosure.

FIG. 6A is a diagram illustrating a configuration of a memory board, for example, the memory board 400 in accordance with an embodiment. Particularly, FIG. 6A illustrates a detailed structure of the data controller 510.

Referring to FIG. 6A, the memory board 400 may include a controller 410 and a plurality of memory devices 420A to 420C. The plurality of memory devices 420A to 420C may be of different types. For example, each of the plurality of memory devices 420A to 420C may be a dynamic random access memory (DRAM), a managed dram solution (MDS), a phase change random access memory (PCRAM), a NAND flash memory, and the like.

In an embodiment, which is described herein, the plurality of memory devices includes first to third memory devices 420A to 420C which are different from one another. However, this is merely an example; the plurality of memory devices may include more than three, some or all of which may be of different types. Also, by way of example, the data processing speed of the first memory device 420A is fastest, that of the third memory device 420C is slowest, and that of the second memory device 420B is in between. Additionally, by way of example, memory capacity of the third memory device 420C is largest, that of the first memory device 420A is smallest, and that of the second memory device 420B is in between. Still further, by way of example, the first memory device 420A is a volatile memory device and the second memory device 420B and the third memory device 420C are nonvolatile memory devices.

The controller 410 may include the data controller 510, an I/O interface 530, and memory controllers 520A to 520C.

The data controller 510 may include a counter 610, a data manager 630, a selector 650, and a processor 670.

The counter 610 may measure a ratio of the number of a read operations to the number of a write operations corresponding to target data. The target data may be data of which read or write request is provided to the data controller 510 from an external device (e.g., compute boards 200 of FIG. 3). And, hereinafter, the ratio of the number of a read operations to the number of a write operations corresponding to target data is referred to as R/W ratio. In detail, the counter 610 may count respectively the number of the read operations corresponding to the target data and the number of the write operations corresponding to the target data. And, the counter 610 may determine the R/W ratio of the target data.

The counter 610 may count the number of the read operations corresponding to the target data as follows: A read command for the target data may include an identifier (ID) and address information for performing the read operation. The controller 410 may recognize the read operation for the target data using the identifier (ID) and the address information. The counter 610 may count the number of the read operations corresponding to the target data on the basis of the read command. In the same principle, the counter 610 count the number of write operations and, determine the R/W ratio corresponding to the target data.

The aforementioned method for counting the number of the read operations and the number of the write operations corresponding to target data is an embodiment and the present invention is not limited thereto.

In addition, the counter 610 may store the counted number of the read operations, the counted number of the write operations, and the determined R/W ratio. Furthermore, the stored number of the read operations, the stored number of the write operations, and the stored R/W ratio may be stored in a memory device 420 as meta data correspond to the target data.

Furthermore, the counter 610 may provide the determined R/W ratio corresponding to the target data to the data manager 630.

The data manager 630 may generate and store a memory map of each of the plurality of memory devices 420A to 420C. And, the data manager 630 may respectively manage the memory map of the first memory device 420A, the memory map of the second memory device 420B, and the memory map of the third memory device 420C. Furthermore, when there is a change in the memory maps due to movement of data stored in each of the plurality of memory devices 420A to 420C, the data manager 630 may update the memory map of each of the plurality of memory devices 420A to 420C.

As described above, the data manager 630 may receive the R/W ratio for the target data determined by the counter 610. The data manager 630 may manage the R/W ratio.

In addition, the data manager 630 may generate meta data corresponding to the target data. The meta data may include address information, the R/W ratio, and information indicating whether the storage of data has been completed. For example, when the target data has been stored in the first memory device 420A, the data manager 630 may generate meta data, which includes address information on the first memory device where the target data has been stored, the R/W ratio of the target data, and information indicating whether the storage of the target data in the first memory device has been completed, based on the memory map.

The selector 650 may select a memory device, where data is to be stored, based on R/W ratio measured in the counter 610.

For example, the first memory device 420A stores the target data only when the R/W ratio of the target data is greater than or equal to a first threshold. Furthermore, the second memory device 420B stores the target data only when the R/W ratio of the target data is less than the first threshold but is greater than or equal to a second threshold. Similarly, the third memory device 420C stores the target data only when the R/W ratio of the target data is less than the second threshold. The first threshold and the second threshold may be set by designer.

Accordingly, the selector 650 may compare the R/W ratio of the target data with the aforementioned thresholds, and select the most suitable memory device where the target data is stored.

The processor 670 may store data in the selected memory device by the selector 650. For example, for target data having R/W ratio greater than the first threshold, the processor 670 may store the target data in the first memory device 420A. For another example, when data stored in the third memory device has R/W ratio greater than the first threshold, the processor 670 may read data from the third memory device 420C and store the data in the first memory device 420A. In this case, the data manager 630 may perform map update for the data having a changed address.

In addition, the processor 670 may store the meta data generated by the data manager 630 based on a memory device 420 storing target data.

In accordance with an embodiment, an upper memory device may process data faster than a lower memory device. On the other hand, the storage capacity of a lower memory device may be larger than the storage capacity of a upper memory device. In accordance with an embodiment, the second memory device 420B may be the lower memory device of the first memory device 420A. And, the third memory device 420C may be the lower memory device of the second memory device 420B. In accordance with another embodiment, a nonvolatile memory device may be the lower memory device of a volatile memory device.

For example, when the memory device storing the target data is a volatile memory device, the processor 670 may store the meta data in a lower memory device of the memory device storing the target data.

For example, when the processor 670 stores the target data to the first memory device 420A, since the first memory device 420A is a volatile memory device, the processor 670 stores meta data corresponding to the target data in the second memory device 420B or in the third memory device 420C.

For example, when the processor 670 stores the target data in the second memory device 420B, since the second memory device 420B is a nonvolatile memory device, the processor 670 may store meta data corresponding to the target data in the third memory device 420C.

For example, suppose that the third memory device 420C may be the lowest memory device. When the processor 670 stores the target data in the third memory device 420C, the processor 670 may store meta data corresponding to the target data in the third memory device 420C.

For example, suppose that target data is stored in the second memory device 420B and meta data corresponding to the target data is stored in the third memory device 420C. When the processor 670 stores the target data read from the second memory device 420B in the first memory device 420A, the processor 670 may store the meta data in the second memory device 420B. However, when the second memory device 420B is volatile memory device, the processor 670 may subsequently store the meta data in the third memory device 420C.

For example, suppose that target data and meta data corresponding to the target data are stored in the third memory device 420C. When the processor 670 stores the target data read from the third memory device 420C in the second memory device 420B, the processor 670 may subsequently store the meta data in the third memory device 420C.

As described above, when target data is stored in a volatile memory device, meta data may be stored in a nonvolatile memory device. The reason for separately storing the target data and the meta data in different types of memory devices is to allow the data controller 510 to easily perform a sudden power off recovery (SPOR) operation when sudden power off (SPO) occurs. When the memory controller 520A, as the interface with the volatile memory device 420A is a nonvolatile dual in-line memory module (DIMM) (NVD), the interface 520A may be powered on for a while even though the SPO occurs. As a consequence, when the SPO occurs, the volatile memory device 420A can be powered on for a while. However, it is not possible to check the status of data stored in the volatile memory device 420A, for example, whether the data is being written or the data has been written. In this case, in order to check the status of data, the processor 670 may read the meta data and check the status of data. When the data has not been written, the data controller 510 may perform the SPOR operation for the data. In addition, when the SPO occurs, the data manager 630 may recover a removed memory map on the basis of the meta data.

Figure 6B:
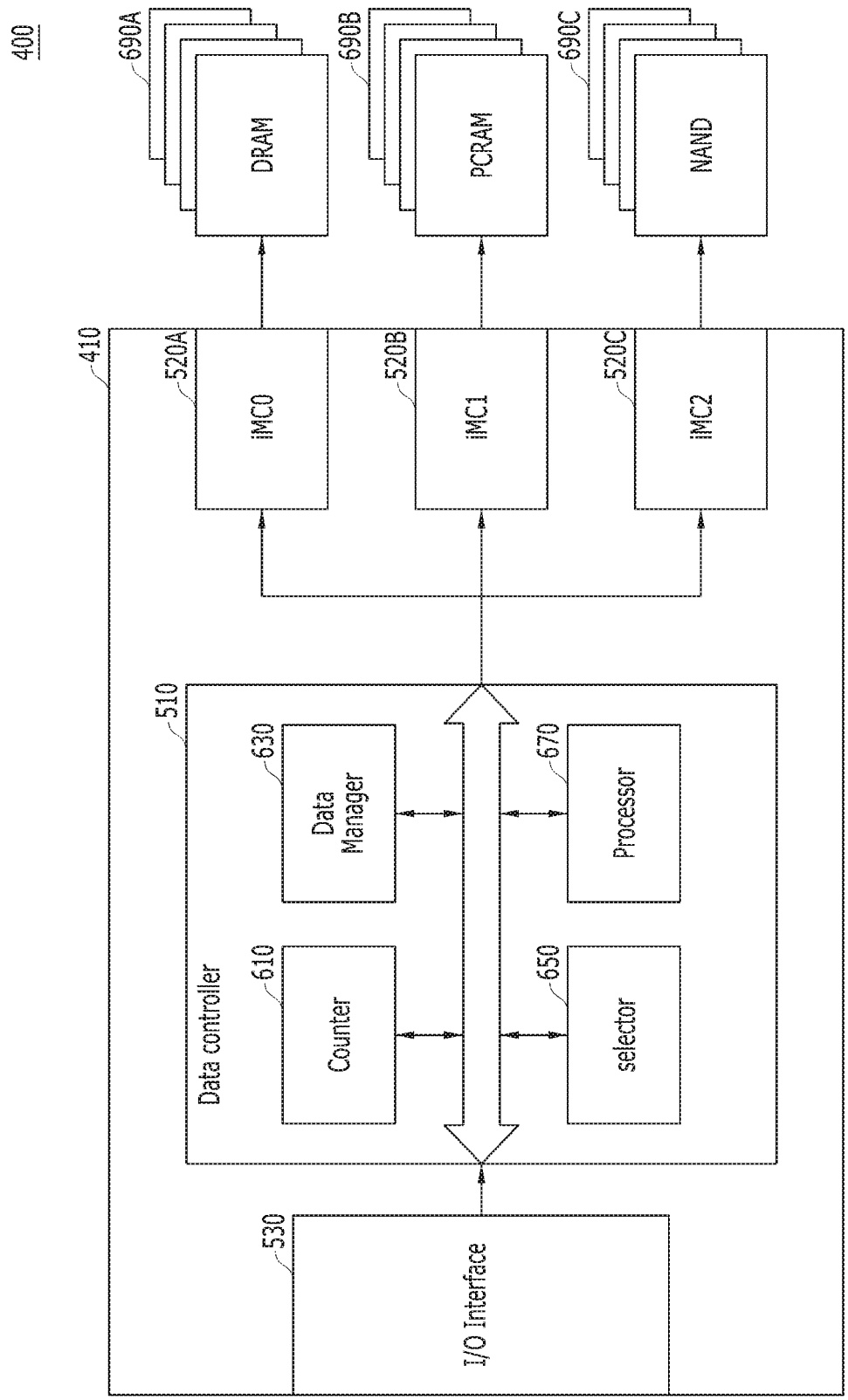
FIG. 6B is a diagram illustrating a detailed configuration of a memory board in accordance with an embodiment of the present disclosure.

FIG. 6B is a diagram illustrating a detailed configuration of the memory board 400 of FIG. 6A in accordance with an embodiment. Referring to FIG. 6B, the first memory device 420A of FIG. 6A may be implemented as a dynamic random access memory (DRAM) 690A. The second memory device 420B of FIG. 6A may be implemented as a phase change random access memory (PCRAM) 690B. The third memory device 420C of FIG. 6A may be implemented as a NAND flash device (hereinafter NAND) 690C. This implementation is by way of example only. Each of the various memory devices may be implemented as a different type of memory device than described immediately above depending on processing and/or storage requirements.

On memory characteristics, data stored in the DRAM 690A may be processed faster than data stored in the PCRAM 690B or the NAND 690C. For example, Data stored in the DRAM 690A may be read faster than data stored in the PCRAM 690B or the NAND 690C. For example, data may be written to the DRAM 690A faster than the PCRAM 690B or the NAND 690C. However, the DRAM 690A may have a smaller storage capacity than the PCRAM 690B or the NAND 690C. Accordingly, the DRAM 690A is a memory device suitable for processing data with a high R/W ratio or data requiring fast processing.

On the other hand, data stored in the NAND 690C may be processed slower than data stored in the PCRAM 690B or DRAM 690A. But the NAND 690C may have a larger storage capacity than the other two. Accordingly, the NAND device 690C is suitable for processing data with a low R/W ratio or data not requiring fast processing.

Since the PCRAM 690B has intermediate properties in terms of processing speed and storage capacity relative to the DRAM 690A and the NAND 690C, it is capable of performing an intermediate role of the DRAM 690A and the NAND 690C.

Referring back to FIG. 6A, the data manager 630 may generate a memory map of each of the DRAM 690A, the PCRAM 690B, and the NAND 690C. And, the data manager 630 may store a plurality of the memory maps. As described above, the data manager 630 may respectively update the memory map of each of the memory devices 690A to 690C.

The selector 650 may select a memory device where target data is to be stored from among the memory devices 690A to 690C. And, the selector 650 may select a memory device where meta data corresponding to the target data is be stored from among the memory devices 690A to 690C based on the memory device in which the target data is stored.

For example, when the R/W ratio of the target data is greater than or equal to the first threshold, the selector 650 may select the DRAM 690A in which to store the target data. That is, as described with reference to FIG. 6A, the selector 650 may select a memory device according to the characteristics (e.g., R/W ratio) of the target data.

Figure 7:
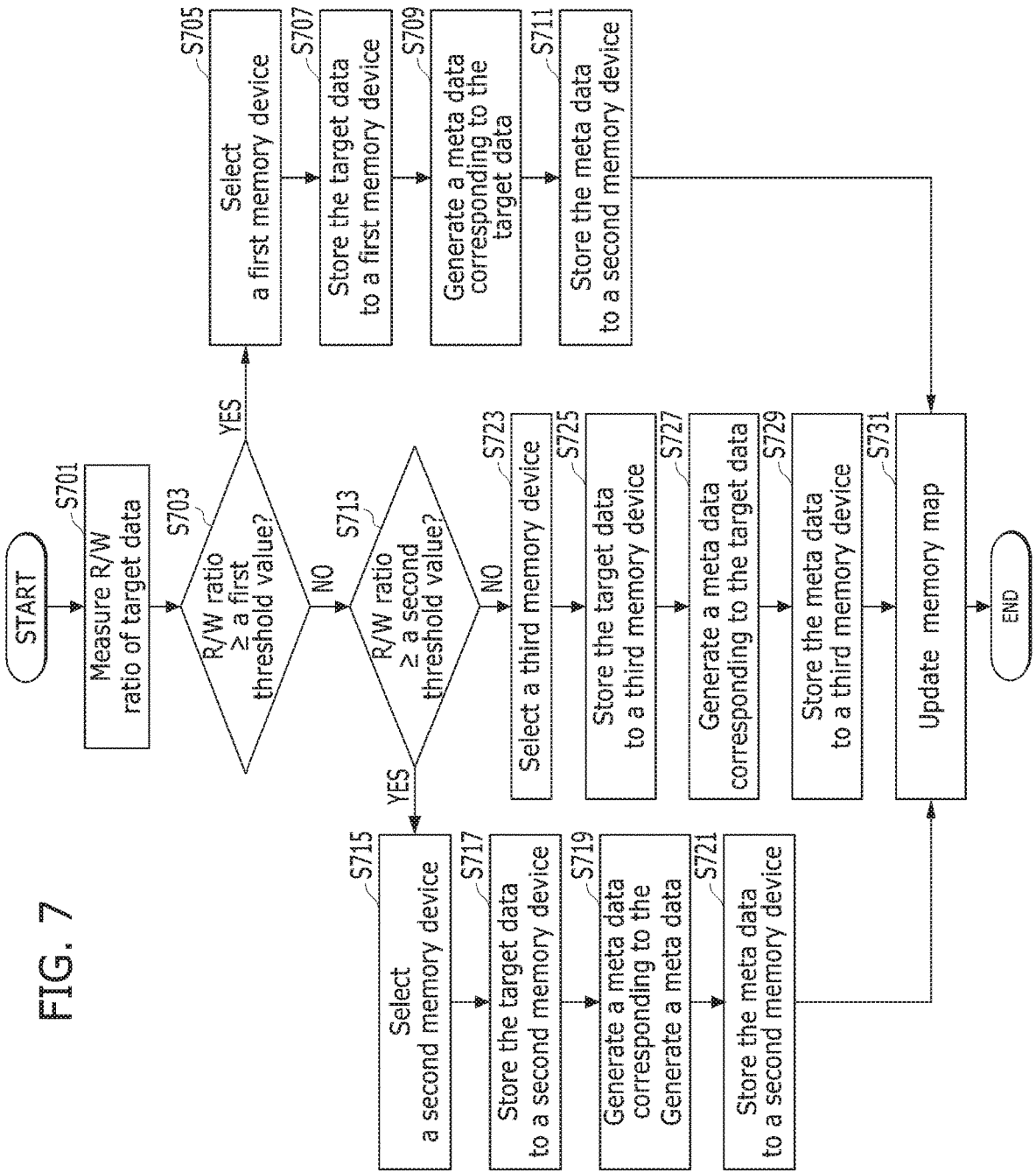
FIG. 7 is a flowchart illustrating an operation of a data controller in accordance with an embodiment of the present disclosure.

FIG. 7 is a flowchart illustrating an operation of a data controller, for example, the data controller 510 in accordance with an embodiment. For example, FIG. 7 illustrates a process in which the data controller 510 determines characteristics of target data, searches for a memory device suitable for storing the target data, and stores the target data in the memory device identified in the searched. For purpose of description here, the target data is write data, and the data manager 630 already stores the memory map of each memory device. Operation of the data controller 510 will be described with reference to FIG. 6A. Referring to FIG. 6A, the first memory device 420A is a volatile memory device and the second memory device 420B and the third memory device 420C are non-volatile memory devices.

At step S701, the counter 610 may measure R/W ratio of target data.

At step S703, the selector 650 may compare the R/W ratio with the first threshold.

When the R/W ratio is greater than or equal to the first threshold ('YES' at step S703), the selector 650 may select the first memory device 420A as the memory device in which to store the target data at step S705.

At step S707, the processor 670 may store the target data in the first memory device 420A.

At step S709, the data manager 630 may generate meta data corresponding to the target data. The meta data may include address information of the target data, the R/W ratio, and information indicating whether the target data has been written. Although it is illustrated in FIG. 7 that the meta data is generated at step S709, this is merely an example. In another example, the data manager 630 may generate the meta data before the step S709, and the data manager 630 may update the meta data at each time at which the data controller 510 has recognized the address information, each time at which the R/W ratio is determined, and each time at which the target data has been written.

At step S711, the processor 670 may store the meta data in the second memory device 420B. As described in FIG. 6A, since the first memory device 420A is a volatile memory device, the processor 670 may store the meta data in the second memory device 420B.

At step S731, the data manager 630 may update a memory map in order to reflect information on the target data stored in the first memory device 420A.

Returning to step S703, when the R/W ratio is less than the first threshold ('NO' at step S703), the selector 650 may compare the R/W ratio with the second threshold at step S713.

When the R/W ratio is greater than or equal to the second threshold ('YES' at step S713), the selector 650 may select the second memory device 420B as the memory device in which to store the target data at step S715.

At step S717, the processor 670 may store the target data in the second memory device 420B.

At step S719, the data manager 630 may generate meta data corresponding to the target data. The meta data may include address information of the target data, the R/W ratio, and information indicating whether the target data has been written. As described above, the meta data may be generated at another time than at step S719, for example, before step S719.

At step S721, the processor 670 may store the meta data in the second memory device 420B. As described in FIG. 6A, since the second memory device 420B is a nonvolatile memory device, the processor 670 may store the meta data, which corresponds to the target data stored in the second memory device 420B, in the second memory device 420B.

At step S731, the data manager 630 may update a memory map in order to reflect information on the target data stored in the second memory device 420B.

Returning to step S713, when the R/W ratio is less than the second threshold ('NO' at step S713), the selector 650 may select the third memory device 420C as the memory device in which to store the target data at step S723.

At step S725, the processor 670 may store the target data in the third memory device 420C.

At step S727, the data manager 630 may generate meta data corresponding to the target data. The meta data may include address information of the target data, the R/W ratio, and information indicating whether the target data has been written. As described above, the time at which the meta data is generated may be different, for example, before step S727.

At step S729, the processor 670 may store the generated meta data in the third memory device 420C. As described in FIG. 6A, since the third memory device 420C is a nonvolatile memory device, the processor 670 may store the meta data, which corresponds to the target data stored in the third memory device 420C, in the third memory device 420C.

At step S731, the data manager 630 may update a memory map in order to reflect information on the target data stored in the third memory device 420C.

Figure 8:
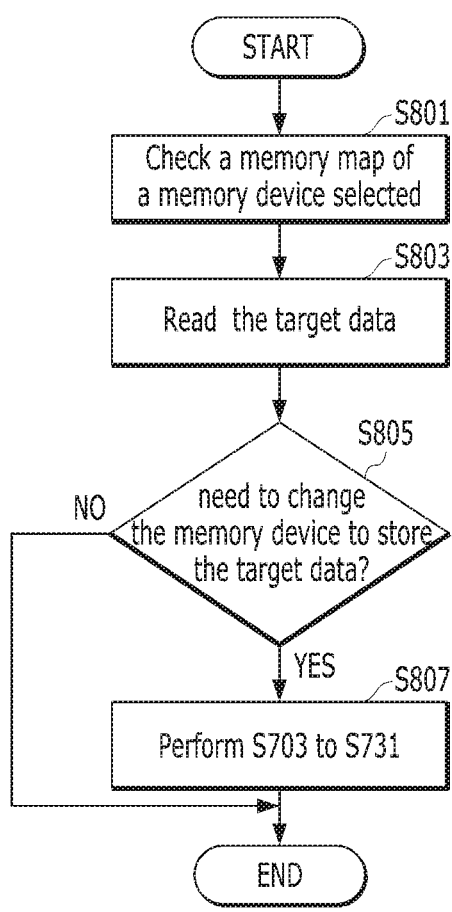
FIG. 8 is a flowchart illustrating an operation of a data controller in accordance with an embodiment of the present disclosure.

FIG. 8 is a flowchart illustrating an operation of a data controller, for example, the data controller 510 in accordance with another embodiment. For example, FIG. 8 is a flowchart illustrating the operation of the data controller 510 when target data is read data.

At step S801, the data manager 630 may check a memory map of a selected memory device. That is, the data manager 630 may check address information of target data.

At step S803, the processor 670 may read the target data from the selected memory device.

At step S805, the data manager 630 may determine whether it is necessary to change the memory device in which the target data is currently stored. For example, when the target data is stored in the third memory device 420C and the number of read operations for the target data is increased and a R/W ratio for the target data is greater than the second threshold, the memory device in which to store the target data may need to be changed from the third memory device 420C to the second memory device 420B.

When there is a need to change the memory device to store the target data ('YES' At step S805), at step S807, the data controller 510 may perform step S703 to step S731 of FIG. 7.

On the other hand, when there is no need to change the memory device to store the target data ('NO' at step S805), the data controller 510 may retain the memory device storing the target data.

Referring back to FIG. 6A, the data controller 510 of the memory board 400 may select a memory device suitable for storing target data according to the characteristics of the target data, and store the target data in the selected memory device. That is, the data controller 510 selects a memory device for storing target data based on the R/W ratio of the target data. For example, the data controller 510 compares the R/W ratio of the target data with the threshold of each of the plurality of memory devices 420A, 420B and 420C. The data controller 510 then stores the target data in the first memory device when fast data processing is required, and stores the target data in the third memory device 420C when fast data processing is not required. However, the data controller 510 does not compare the R/W ratio of the target data with the threshold of the third memory device 420C. A computing system 900, to which the data processing operation described in FIG. 6A is extended, will be described with reference to FIG. 9.

FIG. 9 is a diagram schematically illustrating a structure of the computing system 900 in accordance with an embodiment.

Referring to FIG. 9, the computing system 900 may include a memory board management unit (MMU) 910 and a plurality of memory boards 400A and 400B. The MMU 910 may correspond to the plurality of compute boards 200 and the interconnect board 300 illustrated in FIG. 2 to FIG. 4. Although FIG. 9 illustrates two memory boards 400A and 400B, and that the second memory board 400B includes one type of memory device 420D, this is merely an example. Also, by way of example, first memory device 420A is a dynamic random access memory (DRAM), second memory device 420B is a phase change random access memory (PCRAM), third memory device 420C is a NAND flash memory, and fourth memory device is a hard disk drive (HDD).

The first memory board 400A and the second memory board 400B may correspond to the memory board 400 of FIGS. 6A and 6B, and elements included in the memory boards may respectively correspond to those included in the memory board 400. For example, a first data controller 510A and a second data controller 510B correspond to the data controller 510.

The MMU 910 may manage information on memory device configurations of the plurality of memory boards 400A and 400B. In detail, the MMU 910 may recognize that the first memory device 420A to the third memory device 420C are included in the first memory board 400A and the fourth memory device 420D is included in the second memory board 400B.

In addition, the MMU 910 may communicate with each of the plurality of memory boards 400A and 400B. Accordingly, the MMU 910 may provide and receive data to/from the first memory board 400A and the second memory board 400B. Furthermore, the MMU 910 may provide data received from the first memory board 400A to the second memory board 400B.

The first data controller 510A of the first memory board 400A may store target data in a selected memory device according to the characteristics of the target data. As described above, the first data controller 510A may determine or measure the R/W ratio for the target data, compare the measured R/W ratio with the first threshold and the second threshold, and select a memory device in which to store the target data. In addition, the first data controller 510A may compare the measured R/W ratio with the third threshold. When the R/W ratio is less than the second threshold and is greater than or equal to the third threshold, the first data controller 510A may store the target data in the third memory device 420C. On the other hand, when the R/W ratio is less than the third threshold, the first data controller 510A may provide the target data to the MMU 910 through a first I/O interface 530A. Since the MMU 910 recognizes the characteristics of the plurality of memory devices 420A to 420D included in the plurality of memory boards 400A and 400B, the MMU 910 may provide the target data from the first memory board 400A to the second memory board 400B. The second memory board 400B may receive the target data from the MMU 910. The second data controller 510B of the second memory board 400B may receive the target data through a second I/O interface 530B. Furthermore, the second data controller 510B may store the target data in the fourth memory device 420D. In the same principle, the second data controller 510B may also store meta data corresponding to the target data in the fourth memory device 420D.

When the R/W ratio of the target data stored in the fourth memory device 420D is increased, the second data controller 510B may read the target data. Then, the second data controller 510B may provide the read target data to the MMU 910 through the second I/O interface 530B. The MMU 910 may provide the target data received from the second memory board 400B to the first memory board 400A. The first data controller 510A may receive the target data through the first I/O interface 530A. Then, the first data controller 510A may store the target data in a corresponding memory device on the basis of the R/W ratio for the target data in the same manner as the operation described in FIG. 6A. In the same principle, the first data controller 510A may store the meta data corresponding to the target data in the selected memory device.

As described above, the data controller 510 and the computing system 900 in accordance with embodiments may select a memory device in which to store data, according to the characteristics of the data, and store the data in the selected memory device, thereby efficiently processing the data. That is, the data controller 510 and the computing system 900 can select between a memory device, which stores data requiring fast processing, and a memory device, which stores data which does not require relatively fast processing to efficiently process data. As a consequence, the performance of the entire system may be improved.

Although various embodiments have been described and illustrated, it will be apparent to those skilled in the art in light of the present disclosure that various changes and modifications may be made without departing from the spirit and scope of the invention as defined in the following claims.

What is claimed is:

1. A memory system comprising:
   a plurality of types of memory devices, wherein the plurality of types of memory devices includes a first memory device and a second memory device; and
   a controller including:
      a counter configured to determine R/W ratio, a ratio of a number of read operations to a number of write operations of a target data;
      a data manager configured to generate meta data corresponding to the target data;
      a selector configured to compare the R/W ratio with a threshold of each of the plurality of memory devices, respectively, and select a memory device for storing the target data among the plurality of types of memory devices based on a result of the compare operation and select a memory device for storing the meta data corresponding to the target data among the plurality of types of memory devices based on the memory device in which the target data is stored; and
      a processor configured to store the target data and meta data in the each selected memory device
      wherein the selector compares the R/W ratio with a first threshold corresponding to the first memory device, and selects the first memory device when the R/W ratio is greater than or equal to the first threshold, and
      wherein the processor stores the target data in the first memory device.

2. The memory system of claim 1,
   wherein the first memory device is a volatile memory device and the second memory device is a non-volatile memory device,
   wherein, when the selector selected the first memory device for storing the target data, the selector selects the second memory device for storing the meta data, and
   wherein the processor stores the meta data in the second memory device.

3. The memory system of claim 2,
   wherein the plurality of types of memory devices further includes a third memory device, wherein, when the R/W ratio is less than the first threshold, the selector compares the R/W ratio with a second threshold corresponding to the second memory device, and selects the second memory device when the R/W ratio is greater than or equal to the second threshold, and
   wherein the processor stores the target data in the second memory device.

4. The memory system of claim 3,
wherein, when the selector selected the second memory device for storing the target data, the selector selects the second memory device for storing the meta data, and
wherein the processor stores the meta data in the second memory device.

5. The memory system of claim 4,
wherein, when the R/W ratio is less than the second threshold, the selector selects the third memory device, and
wherein the processor stores the target data and meta data in the third memory device.

6. The memory system of claim 1, wherein the plurality of types of memory devices includes a volatile memory device and a nonvolatile memory device, and
when the target data has been stored in the volatile memory device, the processor stores the meta data in the nonvolatile memory device.

7. An operating method of a memory system including a plurality of types of memory devices, wherein the plurality of types of memory devices includes a first memory device and a second memory device, and a controller that controls each of the plurality of memory devices, the method comprising:
determining R/W ratio—a ratio of a number of read operations to a number of write operations of a target data;
comparing the R/W ratio with a threshold of each of the plurality of memory devices;
selecting a memory device for storing the target data among the plurality of types of memory devices based on a result of the comparing step;
selecting a memory device for storing meta data corresponding to the target data among the plurality of types of memory devices based on the memory device in which the target data is stored; and
storing the target data and meta data in the each selected memory device
wherein the comparing the R/W ratio compares the R/W ratio with a first threshold corresponding to the first memory device,
wherein the selecting a memory device for storing the target data selects the first memory device when the R/W ratio is greater than or equal to the first threshold, and
wherein the storing the target data and meta data stores the target data in the first memory device.

8. The operating method of claim 7,
wherein the first memory device is a volatile memory device and the second memory device is a non-volatile memory device,
wherein, when the selector selected the first memory device for storing the target data, the selecting a memory device for storing the meta data selects the second memory device for storing the meta data, and
wherein the storing the target data and meta data stores the meta data in the second memory device.

9. The operating method of claim 8,
wherein the plurality of types of memory devices further includes a third memory device,
wherein, when the R/W ratio is less than the first threshold, the comparing the R/W ratio compares the R/W ratio with a second threshold corresponding to the second memory device,
wherein the selecting a memory device for storing the target data selects the second memory device when the R/W ratio is greater than or equal to the second threshold, and
wherein the storing the target data and meta data stores the target data in the second memory device.

10. The operating method of claim 9,
wherein, when the selector selected the second memory device for storing the target data, the selecting a memory device for storing the meta data selects the second memory device for storing the meta data, and
wherein the storing the target data and meta data stores the meta data in the second memory device.

11. The operating method of claim 10,
wherein, when the R/W ratio is less the second threshold, the selecting a memory device for storing the target data selects the third memory device,
wherein the selecting a memory device for storing the meta data selects the third memory device, and
wherein the storing the target data and meta data stores the target data and meta data in the third memory device.

12. The operating method of claim 7,
wherein the plurality of types of memory devices includes a volatile memory device and a nonvolatile memory device, and
wherein the storing the target data and meta data stores the target data in the volatile memory device and stores the meta data in the nonvolatile memory device.

13. A computing system comprising:
a first memory system including a plurality of types of memory devices, wherein the plurality of types of memory devices includes a first memory device, a second memory device, and a third memory device, and a first controller configured to control each of the plurality of memory devices;
a second memory system including an additional memory device of a type different than any of the types of the plurality of memory devices and a second controller configured to control the additional memory device; and
a memory board management unit configured to perform data communication with the first memory system and the second memory system,
wherein the first controller and the second controller:
determine a R/W ratio with respect to target data received from the memory board management unit, the R/W ratio representing a number of times a read operation is performed on the target data to a number of times a write operation is performed on the target data,
compare the R/W ratio with a threshold of each of the plurality of memory devices in the first memory system and the additional memory device in the second memory system,
select a target memory device, among the plurality of types of memory devices and the additional memory device, in which to store the target data, and
store the target data in the target memory device
wherein the first controller compares the R/W ratio with a first threshold corresponding to the first memory device, and selects the first memory device as the target memory device when the R/W ratio is greater than or equal to the first threshold.

14. The computing system of claim 13, wherein, when the R/W ratio is less than the first threshold, the first controller compares the R/W ratio with a second threshold corresponding to the second memory device, and selects the second memory device as the target memory device when the R/W ratio is greater than or equal to the second threshold.

15. The computing system of claim 14, wherein, when the R/W ratio is less than the second threshold, the first controller compares the R/W ratio with a third threshold corresponding to the third memory device, and selects the third memory device as the target memory device when the R/W ratio is greater than or equal to the third threshold.

16. The computing system of claim 15, wherein, when the R/W ratio is less than the third threshold, the first controller provides the target data to the memory board management unit, which provides the received target data to the second controller, and the second controller stores the target data in the additional memory device.

17. The computing system of claim 16, wherein, when the R/W ratio is greater than the first threshold, the second threshold, or the third threshold, the second controller provides the target data from the additional memory device to the memory board management unit, which provides the received target data to the first controller, and the first controller stores the target data in one of the plurality of types of memory devices of the first memory system.

* * * * *